No. 632,919. Patented Sept. 12, 1899.
J. W. FARLEY.
APPARATUS FOR DESTROYING TEREDOS AND OTHER MARINE GROWTHS.
(Application filed June 21, 1898.)
(No Model.)

Witnesses
Jos. C. Stack.
Rufus H. Thayer.

Inventor
J. W. Farley.
By Walter F. Rogers
atty.

UNITED STATES PATENT OFFICE.

JAMES W. FARLEY, OF CRAWFORDVILLE, FLORIDA, ASSIGNOR OF ONE-HALF TO L. L. YENT, OF CARRABELLE, FLORIDA.

APPARATUS FOR DESTROYING TEREDOS AND OTHER MARINE GROWTHS.

SPECIFICATION forming part of Letters Patent No. 632,919, dated September 12, 1899.

Application filed June 21, 1898. Serial No. 684,067. (No model.)

*To all whom it may concern:*

Be it known that I, JAMES W. FARLEY, a citizen of the United States, residing at Crawfordville, in the county of Wakulla and State of Florida, have invented certain new and useful Improvements in Apparatus for Destroying Teredos and other Marine Growths; and I do hereby declare the following to be a full, clear, and exact description of the invention, such as will enable others skilled in the art to which it appertains to make and use the same.

My invention relates to means for destroying barnacles, teredos, water-hyacinths, bonnet-beds, and other animal and vegetable marine growths detrimental to the bottoms of floating vessels and other objects; and it consists, essentially, of means for applying heat or other destructive agent against a body of inclosed water adjacent to the vessel or object to be treated, especially adapted to be applied to a floating boat.

Figure 1:
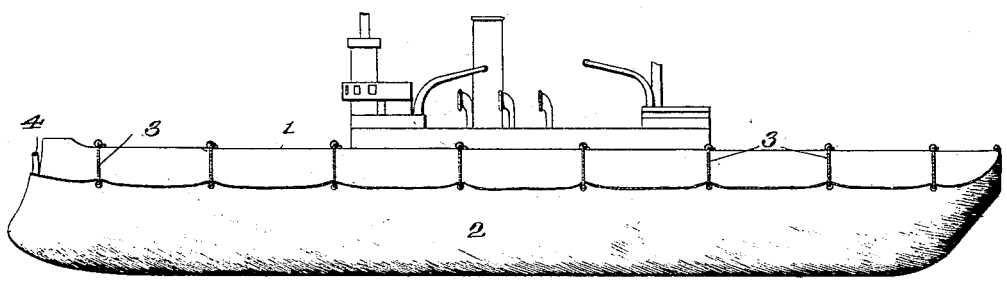
Figure 2:
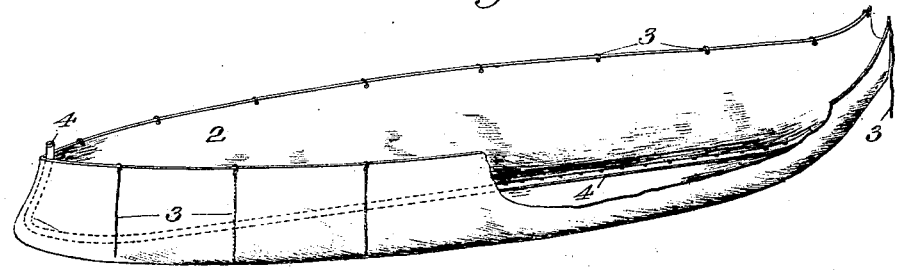

In the drawings, Figure 1 represents a boat with my apparatus attached ready for use. Fig. 2 is a view of the apparatus, partly broken, and Fig. 3 is a perspective of another or modified form.

1 represents the boat to be treated; 2, a flexible envelop, as of canvas; 3, attaching and securing devices, preferably cords; 4, a perforated pipe lying in and preferably secured to the envelop; 5, a dock having a hinged door 6 and adapted to receive a boat; 7, a pipe-joint adapted to feed a return or series pipe 8.

In operation one end of the flexible envelop is sunk at one end—say at the bow—of the boat, and by means of ropes attached to the other end of the envelop it is drawn under and aft to the stern of the boat. Step by step the envelop is drawn up about the boat until it incloses a body of water surrounding the boat's bottom. Then hot air, steam, gas, or other destructive agent is forced down the pipe 4. By using a heating medium the temperature of the water may be so raised as to destroy and in a large measure remove any animal and vegetable life.

Figure 3:
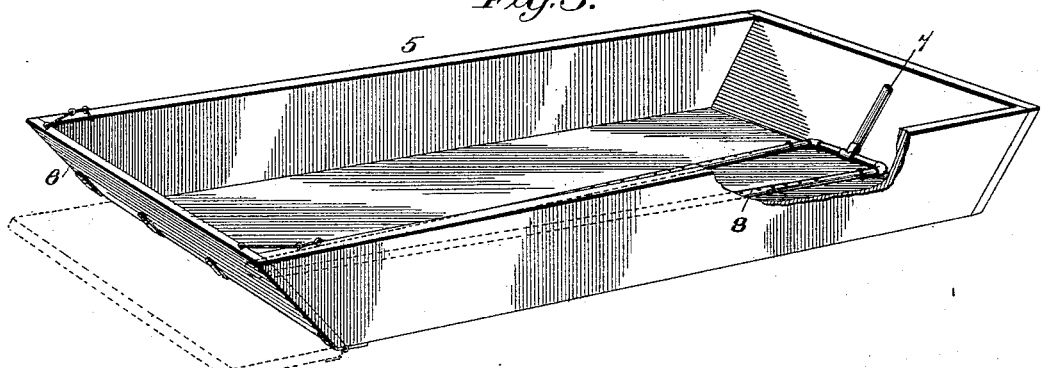

In the alternative or modified form shown in Fig. 3 the dock 5 is sunk a proper distance, a boat is floated while the hinged door 6 is down, the door is then closed and the heating medium applied through the perforated pipe, as in the previous example. The pipe may be arranged in any manner to supply the medium.

The flexible envelop may have a coating of non-conducting substance or may itself be a non-conductor to render the heating of the water more rapid and effectual. The envelop may be made in sections, the pipe may be removable and in sections, and, in short, the whole apparatus may be arranged to easily fold or roll or to be packed for transportation.

My device may be readily used at any place and under almost any circumstances, so that a boat need not be permitted to get into a condition which will render the removal of the marine animals difficult. In fact, the growths may be killed almost as soon as formed, and when the growth is thus killed at an early stage the removal will generally follow by the same operation.

My device is applicable at any time, during a cruise, for example. It may be applied to the ship, the heat turned on, and the growths killed. When the envelop is removed, the subsequent course of the vessel through the water will wash away the dead obstructions.

The dock form may itself serve the final end or it may to excellent advantage precede the usual laborious cleaning.

My invention contemplates especially the application of heat in any form and by any medium to the water adjacent to a boat's bottom or other object to be treated; but, as has been observed, the apparatus may be used to apply other destructive agents. I believe, however, that no other agent is so simple, effective, and safe in application as heat.

While my invention is especially adapted to be used in treating the bottom of boats, it may of course be applied to any vegetable obstructions of rivers or channels or to any growths on rafts, floats, pilings, lighters, &c.

Having fully described my invention, what I desire to secure by Letters Patent is—

1. In an apparatus for removing marine growths from boat-bottoms and elsewhere, the combination of means for inclosing a body of water about the subject to be treated and means for heating the water.

2. The combination of a flexible envelop adapted to be placed about the bottom of a floating vessel and means for discharging a heating medium within the envelop, substantially as described.

In testimony whereof I affix my signature in presence of two witnesses.

JAMES W. FARLEY.

Witnesses:
S. W. MYERS,
B. A. MEGINNISS.